C. C. LEWIS.

Improvement in Plows.

No. 130,435.

Patented Aug. 13, 1872.

Witnesses:
E. Wolff.
N. A. Graham.

Inventor:
Charles C. Lewis.
Per
Attorneys.

UNITED STATES PATENT OFFICE.

CHARLES C. LEWIS, OF GAINESVILLE, ALABAMA.

IMPROVEMENT IN PLOWS.

Specification forming part of Letters Patent No. 130,435, dated August 13, 1872.

Specification describing a new and useful Improvement in Wooden Mold-Board Plows, invented by CHARLES C. LEWIS, of Gainesville, in the county of Sumter and State of Alabama.

Figure 1:
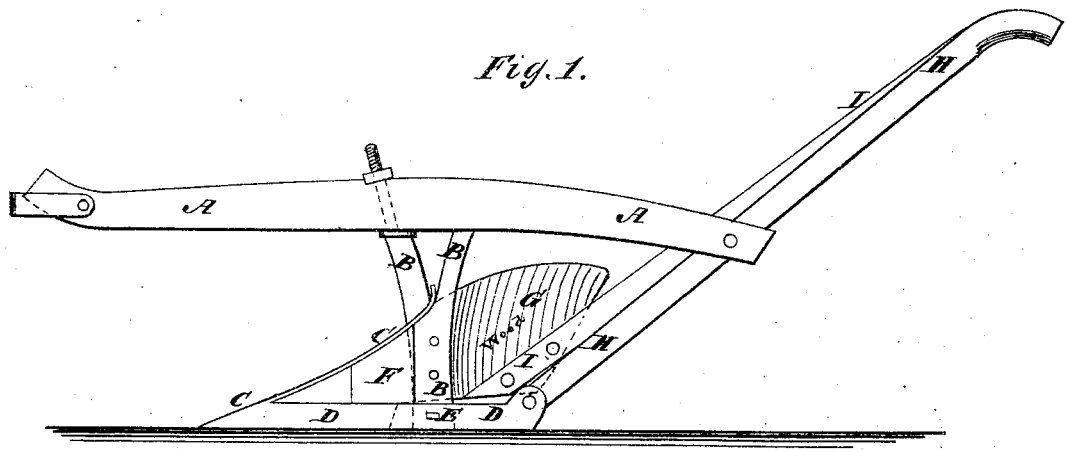
Figure 2:
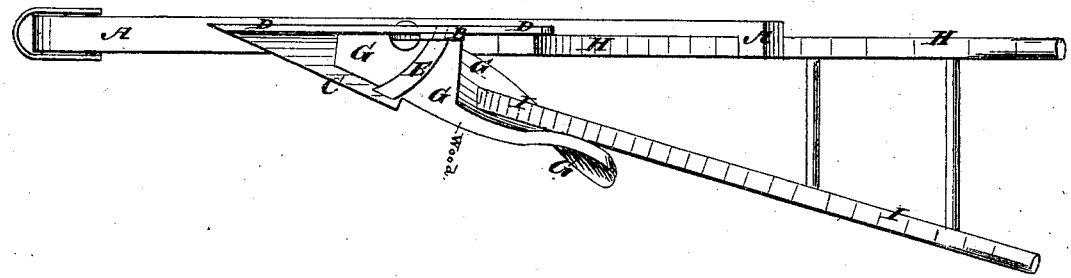

In the accompanying drawing, Figure 1 is a side view of my improved wooden mold-board plow. Fig. 2 is a bottom view of the same.

My invention has for its object to furnish an improved wooden mold-board plow, simple in construction and convenient in use, and which may be made at much less expense than when made in the ordinary manner; and it consists in the construction and combination of various parts of the plow, as hereinafter more fully described.

Similar letters of reference indicate corresponding parts.

A is the plow-beam, to the middle part of which is attached the upper forked end of the standard B. C is the share, in the upper corner of which is formed a hole to receive the forward branch of the standard B, so that the said share may be supported by the fork of the said standard. D is the land-side, the forward end of which is attached to the share C. E is a brace, the outer end of which is attached to the outer part of the share C. The inner end of the brace E passes through the lower end of the standard B, and is secured to the land-side D. The space at the land-side of the plow, between the standard B, share C, and land-side D, is filled or closed with a metallic plate, F. G is the wooden mold-board, the forward end or foot of which is made solid and of such a form as to fit into the cavity of the share, where it is secured in place by bolts passing through it, through the rear part of the share C, and through the standard B. I prefer a wooden mold-board on the score of lightness and cheapness; and for light soils or for furrowing it answers the purpose satisfactorily. H is the land-side handle, which is bolted to the rear end of the beam A, and the lower end of which is bolted to the rear end of the land-side D. I is the mold-board handle, the lower end of which is bolted to the rear end of the mold-board G, and which is connected with the handle H by rounds, in the ordinary manner.

Having thus described my invention, I claim as new and desire to secure by Letters Patent—

1. The arrangement of the standard B and brace E in connection with the beam A, share C, land-side D, and wooden mold-board G, substantially as herein shown and described, and for the purposes set forth.

2. The iron plate F, interposed between the standard B, share C, land-side D, and wooden mold-board G, substantially as herein shown and described.

CHARLES CARRINGTON LEWIS.

Witnesses:
WM. M. LEWIS,
C. D. WOODRUFF.